United States Patent [19]
Johnson

[11] 3,867,758
[45] Feb. 25, 1975

[54] METHOD OF MAKING GLASS INSULATED ELECTRICAL COILS

[75] Inventor: Daniel B. Johnson, Muskegon, Mich.

[73] Assignee: The Anaconda Company, New York, N.Y.

[22] Filed: May 15, 1974

[21] Appl. No.: 470,085

Related U.S. Application Data

[62] Division of Ser. No. 377,163, July 6, 1973, Pat. No. 3,842,193.

[52] U.S. Cl.............. 29/605, 156/56, 174/122 G, 174/122 GC, 336/205, 336/206
[51] Int. Cl. ............................................. H01f 7/06
[58] Field of Search..... 29/605; 174/120 R, 120 SR, 174/121 R, 121 SR, 122 G, 124 GC; 156/53, 56; 336/205, 206

[56] References Cited
UNITED STATES PATENTS

| 2,935,631 | 5/1960 | Jones .................................. 29/605 |
| 3,012,092 | 12/1961 | Whearley et al................ 174/121 R |
| 3,649,744 | 3/1972 | Coleman ..................... 174/124 GC |

FOREIGN PATENTS OR APPLICATIONS

| 1,033,103 | 6/1966 | Great Britain ....................... 29/605 |

Primary Examiner—Carl E. Hall
Attorney, Agent, or Firm—Victor F. Volk

[57] ABSTRACT

In the manufacture of glass insulated coils, the wire is not enameled until the coil has been formed. The wire is insulated with tapes separated from a wide band formed by enameling and baking a large plurality of parallel glass fibers.

4 Claims, 4 Drawing Figures

PATENTED FEB 25 1975 3,867,758
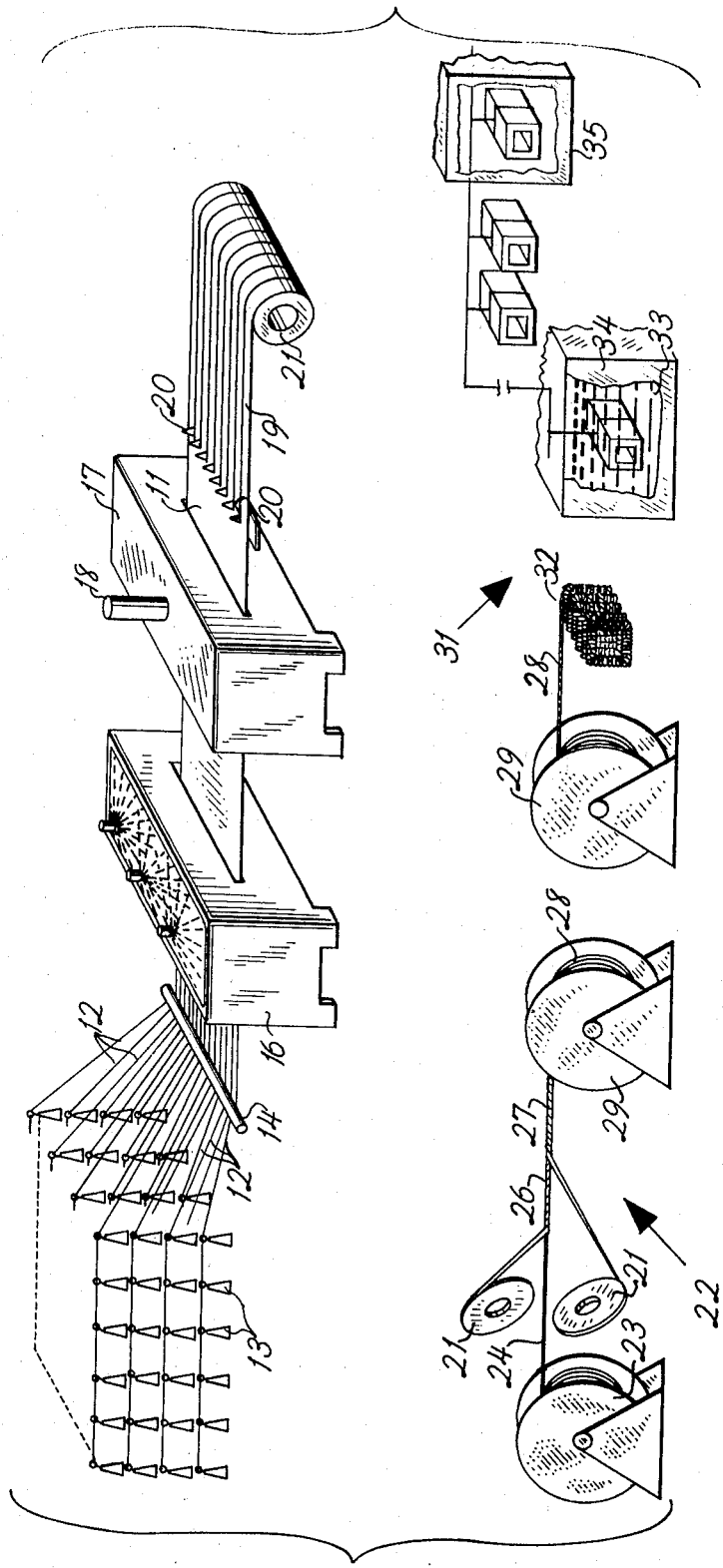
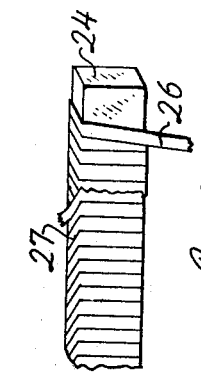

METHOD OF MAKING GLASS INSULATED ELECTRICAL COILS

This is a division of application Ser. No. 377,163 filed July 6, 1973, now U.S. Pat. No. 3,842,193.

BACKGROUND OF THE INVENTION

In the manufacture of electrical apparatus, it has been known to serve glass fibers onto a magnet wire at an enameling machine where the glass covered wire is coated with enamel and immediately baked. The thus insulated magnet wire is taken up on reels and shipped to a coil fabricating site where it is formed into coils of a configuration that will vary for different types and sizes of electrical apparatus. The coils, usually before installation into the apparatus, are dipped into a tank of enamel (which may be referred to as varnish), that must be compatible with the enamel that was used initially for insulating the wire and, indeed, may comprise the same resinous polymer. After dipping, the coils are baked to evaporate volatiles from the newly applied enamels and, if the enamel is thermosetting, effect a cure. The foregoing procedure is seen to require dual enameling and baking steps, first before and then after the coil has been formed. The second insulating step, wherein the coil is actually dipped into an enamel bath, and thus becomes thoroughly impregnated, would be sufficient for the electrical insulation of the apparatus, but the first step has been heretofore considered necessary because of the fragile nature of glass fibers which would be abraded during the steps of reeling and unreeling the insulated wire and forming the coils if they were not protected by an enamel coating.

SUMMARY

I have invented a method whereby one of the enameling and baking operations is avoided with a concomitant saving in cost and in the atmospheric contamination that is inherent in large scale enameling operations. In my method of making an electric coil, I draw a very long continous length of wire to a prescribed cross-sectional area and shape such, usually, as round, square or rectangular, the latter two usually with rounded corners. I support a large plurality of continuous glass fibers adjacently positioned in substantially planer configuration and advance them through enamel coating apparatus where they are coated with a continuous enamel film. I then pass the coated fibers through a baking zone where the enamel is dried and possibly fused thus forming a wide band of longitudinally glass-fiber-reinforced enamel insulation. This band is then divided into a plurality of individual tapes which I helically wrap around a continuous bare length of wire to form an insulated conductor. I form this conductor into a coil, impregnate the coil with insulating enamel which may have the same polymeric composition as the enamel applied to the glass, and finally bake the coil. The enamel may be applied to the fibers in solution or with the enamel free from solvent.

An elongated insulated conductor of my invention, of a length sufficient to wind a plurality of coils, comprises a metal wire, a first helical serving of tape directly covering the wire with a preselected direction of lay and a second serving of tape directly covering the first serving with an opposite direction of lay. These tapes comprise a plurality of continuous glass fibers laid parallel and are free from any crossing fibers. The parallel fibers are coated and bonded together with baked insulating enamel but the wire itself does not have any enamel adhered to it. In one embodiment of my invention, the wire is covered with a layer of the tape, applied with approximately a 50 percent overlap.

BRIEF DESCRIPTION OF THE DRAWING

In the drawing:

FIG. 1 shows the steps in a method of my invention.

FIG. 2 shows a pictorial view, partly unwrapped, of a conductor of my invention.

FIG. 3 shows a pictorial view, partly unwrapped, of another conductor of my invention.

FIG. 4 shows a pictorial view of tape used in the practice of my invention.

DETAILED DESCRIPTION OF PREFERRED EMBODIMENT

My improved method is illustrated in FIG. 1 wherein first I form a broad band 11 of insulating material from a very large plurality of glass fibers 12 in the form of untwisted yarn being paid from a large number of cops 13 under a roller guide 14 which supports the fibers 12 close together in parallel as they pass through a coating apparatus 16 wherein they are coated with an electrical insulating grade of enamel. The enamel to be used can be selected to meet the temperature rating and other conditions of service of the coil. Known types of enamel comprising polymers such as polyvinyl acetal, polyamide-silicone, polyamide-imide, polyimide, polyester, epoxy and blends and copolymers of these may be used within the scope of our invention. These may be applied to the fibers in solution by known methods such as flow coating and spraying and by solvent free methods such as methods where finely ground powder of the composition is held in water or air suspension. The coated fibers 12 pass through an oven 17 where the enamel is fused into a continuous film binding the fibers together to form the wide band 11. Where solvent or a suspension medium is present, or decomposition products are given off in baking, they can be removed through an oven stack 18 and curing or vulcanization can be accomplished in the oven 17 when a thermoset enamel is used.

On leaving the oven 17, and being cooled, the band 11 passes over a large plurality of slitter blades 20 where it is slit into narrow tapes 19 taken up into pads 21.

It may be thought that this operation of coating the fibers 12 is, in some sense, a duplication of the prior art application of enamel to the glass wrapped conductor which I have now sought to eliminate. Although this so-far-described coating may proceed at the same speed, characteristically 12 feet per minute, as the enameling of wrapped wire, it has the advantage of coating sufficient tape for a large number of wires at one time and of doing a more satisfactory job of coating the glass surfaces. When glass is coated on the wire, all the surfaces are not exposed to contact with enamel as they are in the present method. There is also a significant economy in heating and, particularly, cooling the enameled product since the wire itself, which is a very good heat conductor, is not required to be heated and cooled in the present method.

An enlarged view of the tape 19 is shown in FIG. 4 wherein all the glass fibers are lying parallel with no fibers crossing over the others. This has an advantage of minimizing the tape thickness as well as assuring the complete surrounding of each fiber with enamel.

In a taping machine 22, a reel 23 holding a long length of wire 24 sufficient to make a number of coils, and which is free from enamel, receive a first helical serving 26 with a right hand lay and a second helical serving 27 with a left hand lay from the pads 21 of tape 19. These tapes are applied with a butt lap in both layers. Additional layers can, however, be applied where more insulation is required. A taping machine can be operated at a much higher through speed than an enameling oven for glass wrapped wire since the baking step is no consideration. In the taping step, I have diagrammed the type of taping machine wherein pads of tape are rotated in planatary fashion around the wire. Taping machines, whereby the wire passes through the pads, are also known and can be used in my method. Indeed, the tapes are not necessarily applied from pads but can have initially been wound on spools or cops and applied to the conductor by taping machines accommodating those packages.

The wrapped wire constitutes an insulated conductor 28 which is taken up on a reel 29 which is removed to a coil forming site 31 which may be remote from the conductor making location, such as, for example, the factory of a customer of the conductor manufacturer. At the site 31, the conductor 28 is formed into a coil 32 by known types of coil making machines. Coils 32 are dipped in an enameling tank 33 containing an enamel or varnish 34 that is compatible with the coating on the tapes 19. Indeed, it is advantageous for the enamel 34 to comprise the same polymer as the enamel on the tape, although a different more diluent solvent system may be used. On removal from the tank 33 the coils 32 are baked in an oven 35 in the final step of my method.

In my method, the insulation applied in a single taping operation may be selected to have any desired thickness merely by the addition of tape layers. This is not true of the prior art method of enameling the wire after it was served with glass fibers since there is a limit to the depths of glass that the enamel will penetrate in any commercially practical application method. In FIG. 2, I have shown a rectangular wire 24 insulated with the two layers 26, 27 of the tapes 19 as applied by the apparatus 22. The servings shown are partially uncovered to illustrate the direction of wind. Both of the servings 26, 27 are butt lapped which means that the individual turns do not overlap and a slight spacing may be permitted between turns (negative butt lap) to allow the tapes to move together at the inside surface of an arc formed by the wire in coiling. In FIG. 3, which shows a square wire 36, a single serving 37 of a tape 19 is applied with 50 percent overlap. To build up adequate insulation, additional butt-lapped servings can be applied to the conductor of FIG. 2 or an overlapped serving, such as the serving 37, can be applied over the serving 27. Other serving combinations may also be used, my method thus providing for a large selection of constructions within the scope of my invention, the foregoing description of which has been exemplary rather than definitive and for which I desire an award of Letters Patent as defined in the following claims.

I claim:

1. The method of making an electrical coil comprising the steps of;
   A. drawing a length of wire to a preselected cross-sectional area and shape,
   B. supporting a large plurality of continuous glass fibers adjacently positioned in substantially planar configuration and advancing said fibers through enamel-coating apparatus, thereby coating said fibers with a continuous film of said enamel,
   C. passing said fibers through a baking zone, thereby drying said enamel and forming a wide band of longitudinally glass-fiber-reinforced enamel insulation,
   D. dividing said band into a plurality of individual tapes,
   E. helically wrapping said tapes around a continuous bare length of said wire to form insulated conductor,
   F. winding said conductor into an electrical coil,
   G. saturating said coil with insulating enamel,
   H. baking said coil being coated with said enamel.

2. The method of claim 1 wherein said enamel saturating said coil has substantially the same polymeric composition as said enamel coating said fibers.

3. The method of claim 1 wherein said enamel coating said fibers is applied in solution.

4. The method of claim 1 wherein said enamel coating said fibers is applied free from solvent.

* * * * *